US012746600B2

(12) United States Patent
Seitz et al.

(10) Patent No.: US 12,746,600 B2
(45) Date of Patent: Sep. 29, 2026

(54) SYSTEM AND METHOD FOR MANUFACTURING ASSEMBLY UNITS AS WELL AS USE OF THE SYSTEM

(71) Applicant: Robert Bosch GmbH, Stuttgart (DE)

(72) Inventors: Benjamin Seitz, Calw Ernstmuehl (DE); Martin Schoepf, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 856 days.

(21) Appl. No.: 17/772,653

(22) PCT Filed: Sep. 23, 2020

(86) PCT No.: PCT/EP2020/076556
§ 371 (c)(1),
(2) Date: Apr. 28, 2022

(87) PCT Pub. No.: WO2021/089228
PCT Pub. Date: May 14, 2021

(65) Prior Publication Data
US 2022/0402033 A1 Dec. 22, 2022

(30) Foreign Application Priority Data
Nov. 8, 2019 (DE) .................... 10 2019 217 293.8

(51) Int. Cl.
*B33Y 10/00* (2015.01)
*B22F 10/28* (2021.01)
*B22F 12/33* (2021.01)
*B22F 12/40* (2021.01)
*B22F 12/86* (2021.01)
(Continued)

(52) U.S. Cl.
CPC .............. *B22F 10/28* (2021.01); *B22F 12/33* (2021.01); *B22F 12/40* (2021.01); *B22F 12/86* (2021.01); *B33Y 10/00* (2014.12); *B33Y 30/00* (2014.12); *B33Y 80/00* (2014.12)

(58) Field of Classification Search
CPC ........ B22F 12/86; C29C 64/245; B29C 64/30
See application file for complete search history.

(56) References Cited

U.S. PATENT DOCUMENTS 9,456,884 B2 * 10/2016 Uckelmann ........ A61C 13/0019
10,357,827 B2 * 7/2019 Shaw ...................... B22F 12/38
(Continued)

FOREIGN PATENT DOCUMENTS

CN 105034394 A 11/2015
CN 107107627 A 8/2017
(Continued)

OTHER PUBLICATIONS

International Search Report for PCT/EP2020/076556 Issued Dec. 11, 2020.

*Primary Examiner* — Xiao S Zhao
*Assistant Examiner* — Nicholas J Chidiac
(74) *Attorney, Agent, or Firm* — Norton Rose Fulbright US LLP

(57) ABSTRACT

A system for manufacturing assembly units. The system includes a component platform that is movably situated in a conveying direction, at least one layering unit for applying a layer, and at least one irradiation unit, which is situated downstream from the layering unit in the conveying direction of the component platform for selectively irradiating the layer for generatively assembling the layer.

15 Claims, 4 Drawing Sheets

(51) Int. Cl.
*B33Y 30/00* (2015.01)
*B33Y 80/00* (2015.01)

(56) References Cited

U.S. PATENT DOCUMENTS

| | | | | |
|---|---|---|---|---|
| 10,548,695 | B2 * | 2/2020 | Uckelmann | A61C 13/20 |
| 10,987,868 | B2 * | 4/2021 | Houben | B22F 7/02 |
| 11,292,063 | B2 * | 4/2022 | Shaw | B22F 12/80 |
| 11,383,440 | B2 * | 7/2022 | Patel | B33Y 10/00 |
| 11,440,251 | B2 * | 9/2022 | Uckelmann | B29C 64/245 |
| 12,005,643 | B2 * | 6/2024 | Uckelmann | B29C 64/393 |
| 12,311,604 | B2 * | 5/2025 | Mandelbaum | B29C 64/255 |
| 2013/0108726 | A1 * | 5/2013 | Uckelmann | B29C 64/236 425/375 |
| 2016/0214327 | A1 * | 7/2016 | Uckelmann | B29C 64/393 |
| 2017/0028472 | A1 * | 2/2017 | Shaw | B22F 10/73 |
| 2017/0071707 | A1 * | 3/2017 | Uckelmann | B33Y 30/00 |
| 2018/0141275 | A1 * | 5/2018 | Patel | B29C 64/176 |
| 2019/0224913 | A1 | 7/2019 | Krol et al. | |
| 2019/0224919 | A1 * | 7/2019 | Houben | B29C 64/236 |
| 2019/0321889 | A1 * | 10/2019 | Shaw | B23K 37/003 |
| 2020/0229905 | A1 * | 7/2020 | Uckelmann | B33Y 30/00 |
| 2022/0388242 | A1 * | 12/2022 | Uckelmann | B29C 67/0007 |
| 2024/0165880 | A1 * | 5/2024 | Mandelbaum | B33Y 40/00 |

FOREIGN PATENT DOCUMENTS

| | | | |
|---|---|---|---|
| DE | 102016219037 | A1 | 4/2018 |
| DE | 102016226150 | A1 | 6/2018 |
| EP | 3023177 | A1 | 5/2016 |
| EP | 3456513 | A1 | 3/2019 |
| WO | 9003893 | A1 | 4/1990 |

* cited by examiner

SYSTEM AND METHOD FOR MANUFACTURING ASSEMBLY UNITS AS WELL AS USE OF THE SYSTEM

FIELD

The present invention relates to a system for manufacturing assembly units, in particular for large-scale applications. The present invention further relates to a method for manufacturing assembly units as well as the use of the system and the method.

BACKGROUND INFORMATION

A system for manufacturing assembly units is described in German Patent Application No. DE 10 2016 226 150 A1. This system designed as a carousel-type system is characterized in that in the area of a product assembly container multiple layering and irradiation units are situated that make it possible to generate, by way of example, four layers on a component situated one on top of the other during a complete rotation of the assembly container about its vertically situated axis of rotation. As a result, this system has a relatively high assembly rate or efficiency. The system is suitable in particular for manufacturing prototypes or components that are exclusively made of the corresponding layers of the material, no further manufacturing steps being provided within the product assembly container.

SUMMARY

A system according to the present invention for manufacturing assembly units may have, in particular, the advantage that it makes possible within the scope of large-scale applications the assembly of assembly units, in which on the surface of base components at least one layer is generated in a generative process, the base component forming the assembly unit together with the at least one layer. In other words, this means that this makes it possible for the system according to the present invention to generate the components of relatively complex assembly units, which are partially manufactured in a generative manufacturing process, directly on the base components, so that no further manufacturing or production steps are essentially necessary for the manufacture of the assembly units after the manufacture of the assembly units. That part of the system, with the aid of which the at least one layer is generated in the generative process, thus represents merely one integral part of a comprehensive system, which in particular makes possible a particularly high productivity and thus relatively low manufacturing costs of complex assembly units in the case of large-scale applications.

An example embodiment of the present invention provides that several assembly unit carriers are situated on the component platform, the assembly unit carriers being designed to accommodate at least one base component of the assembly unit to be produced, on whose surface the generative assembly of the at least one layer of the assembly unit takes place. The assembly unit carriers thus make it possible to place the base components of the assembly units in exact positions as well as provide the possibility of additionally movably placing the assembly unit carriers with regard to the component platform with the aid of appropriate measures.

Advantageous refinements of the system according to the present invention for generatively manufacturing components, are disclosed herein.

In terms of the placement of the assembly unit carriers on the components platform, there are various possibilities that are adapted in particular with regard to the size of the system or its productivity. In accordance with an example embodiment of the present invention, it may be provided, in particular, that the assembly unit carriers are situated on the component platform in the conveying direction and/or perpendicularly to the conveying direction. In other words, this means that it is also possible to place multiple assembly unit carriers on the component platform perpendicularly to the conveying direction to achieve a particularly high productivity, so that identical processing procedures may take place at the assembly unit carriers at the same time.

To achieve a particularly high productivity, it is moreover necessary to automate in particular the supply and removal of the assembly unit carriers or to make it possible for the system to be continuously operable. For this purpose, a further embodiment of the present invention provides that the system is designed as a (linear) in-line system including a placement device and a removing device for placing the assembly unit carriers on or taking them off the component platform. In a supply area of the system, the assembly unit carriers are supplied to the system already equipped with the base components and in an outward transport area, the assembly units generated in the system are removed together with the assembly unit carriers.

Instead of a (linear) in-line system, it is alternatively also possible that the system is designed as a carousel-type system having a component platform that is rotatable about an axis and that includes a placement device and a removing device for placing the assembly unit carriers on or taking them off the component platform.

To allow for a processing of the assembly units that is as flexible and universal as possible during the transport within the system, it may moreover be provided that the assembly unit carriers are situated pivotably about at least one axis of the assembly unit carriers on the component platform. This makes it possible, for example, to also subject the back side of the base components to the necessary processing steps, without the base components having to go through the system again or having to be processed on separate processing stations.

The system concept according to the present invention not only makes it possible to carry out a generative assembly of components on the base components for generating assembly units, but also additional further processing steps within the system, so that after the assembly unit carriers have gone through the system, the assembly units are at least essentially completely manufactured or produced. To make this possible, a further, particularly preferred embodiment of the present invention provides that in addition to the at least one layering unit and the at least one irradiation unit, at least one further processing station is situated along the conveyance path of the assembly unit carriers.

Such a further processing station may be designed, for example, as an application device, a surface processing device, a cleaning device, a placement device, or the like.

To achieve a system concept that is preferably flexible and allows for a module-like structure or a preferably simple adaptation to various applications with relatively little constructive effort to be accomplished, it is provided that at least the at least one layering unit and the at least one irradiation unit are designed as part of a combined module. A module of this type may, for example, be integrated at different, standardized receptacle sites within the system or the system housing, to allow, for example, for additional processing stations to be situated between two modules, depending on the application.

In particular, the system according to an example embodiment of the present invention provides that in the case of multiple layering units, these are situated in the conveying direction of the assembly unit carriers at different levels with regard to one another. "Placing the layering units at different levels with regard to one another" is understood to mean that a second layering unit, following a first layering unit, applies a (further) material layer onto a previously applied and selectively irradiated layer and is thus situated at a higher level with regard to the corresponding layer thickness of the first layer.

The present invention further includes a method for generatively manufacturing assembly units, in particular with the aid of a system according to the present invention described above, the assembly units having at least one, preferably several layers that are situated one on top of the other and generatively manufactured. The method according to an example embodiment of the present invention is characterized in that the at least one layer on a base component is generated as an integral part of the assembly unit to be designed and in that the base component is situated on an assembly unit carrier that is conveyed with the aid of a component platform of the system that is movable within a conveyance device. A method is advantageous in which the assembly unit carriers are continuously moved in the conveying direction within the system, since this makes possible a short manufacturing time. A method is particularly advantageous in which alternatively or in addition the produced assembly unit is removed after going through the system once.

The present invention also includes the use of an above-described system according to the present invention or method according to the present invention for manufacturing assembly units in the form of circuit components or cooling devices.

Further advantages, features, and details of the present invention result from the following description of preferred exemplary embodiments and on the basis of the figures.

DETAILED DESCRIPTION OF EXAMPLE EMBODIMENTS

Figure 1:
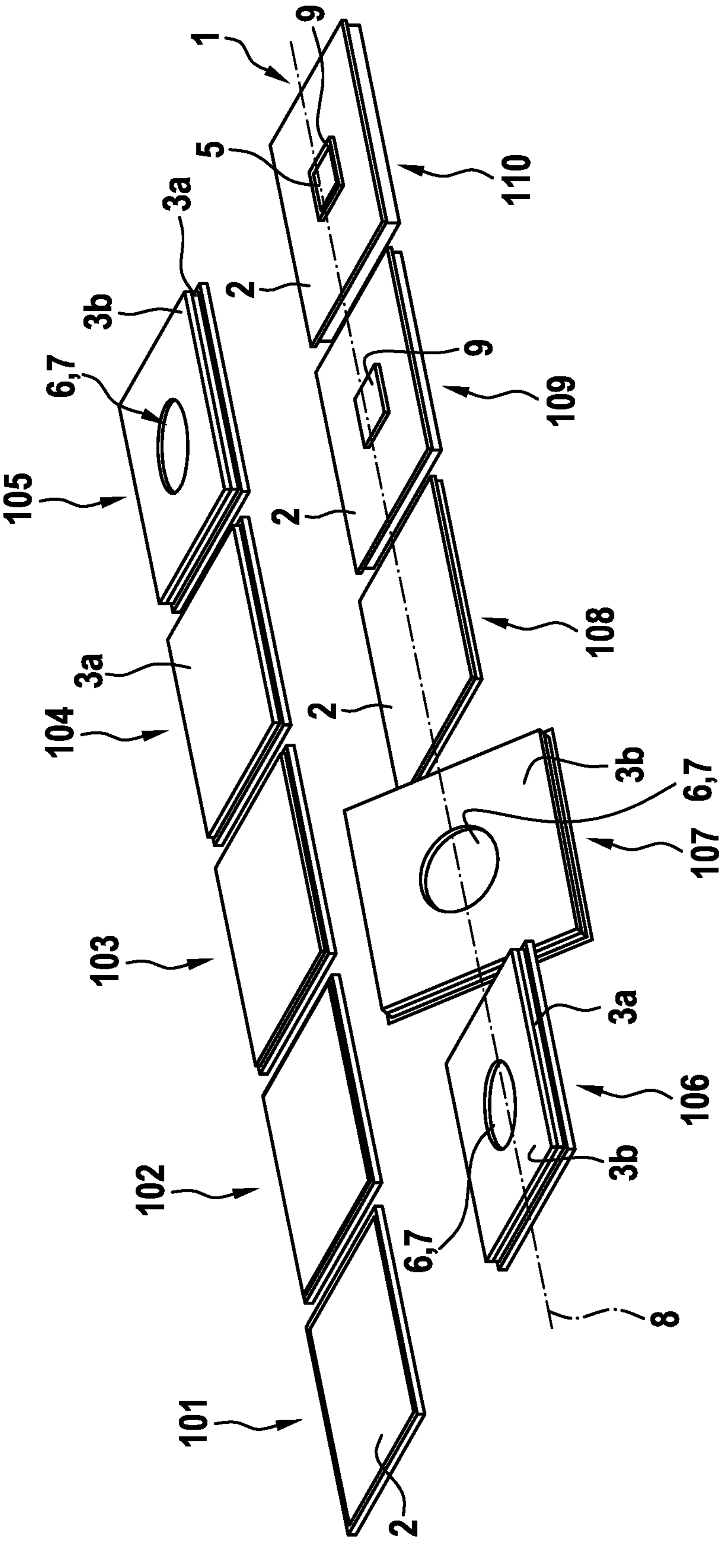
FIG. 1 shows in a perspective illustration a sequence of processing steps for generating an assembly unit that has a circuit carrier equipped with a chip.

Identical elements or elements having identical functions are provided with identical reference numerals in the figures.

FIG. 1 shows, as an example only, various consecutive production or processing steps for generating an assembly unit 1. Assembly unit 1 includes a base component 2 in the form of a circuit board, a substrate, or the like, on which in a generative manufacturing process at least one layer 3*a*, 3*b* is applied and selectively irradiated, so that at least one layer 3*a*, 3*b* is generated in the generative manufacturing process. Furthermore, assembly unit 1 includes an electronic component part 5 in the form of a chip that is situated on the side of base component 2 facing away from at least one layer 3*a*, 3*b*, by way of example.

To generate an assembly unit 1 of this type, corresponding base component 2 is provided in a first step 101. In a second step 102, the top side of base component 2 is (fully) coated with a gold layer, by way of example. In a third step 103, an aluminum layer is subsequently applied to the previously applied gold layer. In steps 104 and 105, two layers 3*a*, 3*b* are applied on the aluminum layer in the generative manufacturing process, by way of example. In a central area 6 of base component 2, no material of layer 3*a*, 3*b* is provided, so that a cylindrical recess 7 is generated there by way of example. In steps 106 through 108, a rotation of base component 2 together with the layers applied thereto subsequently takes place about a longitudinal axis 8 of base component 2 by 180°. This makes it possible for the back side of base component 2 to be subsequently subjected to further processing steps. In a step 109, the placing or providing of a contact layer 9 initially takes place on the back side of base component 2. In a step 110, the applying or placing of structural element 5 or the chip on the back side of base component 2 finally takes place to complete assembly unit 1.

It is additionally elucidated that the above-described production or processing steps for generating assembly unit 1 are described as an example only and must be adjusted to the particular application with regard to the number as well as the individual processing steps. This makes it possible for stations that are designed in the form of an application device, a surface processing device, a cleaning device, a placement device, or the like, to be provided in the individual processing steps. Assembly unit 1 is in particular, however not in a limiting manner, a circuit configuration or cooling device.

Figure 2:
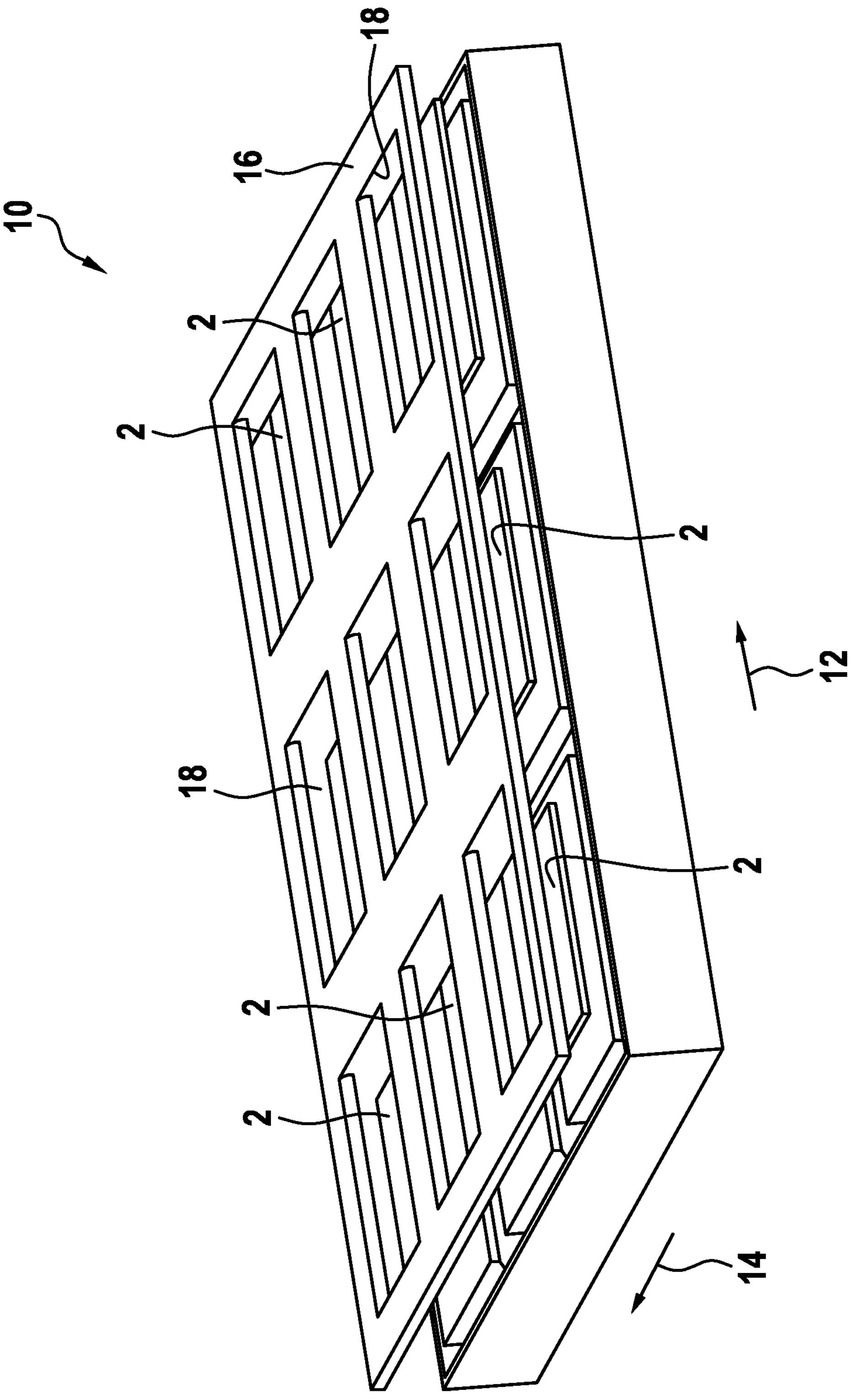
FIG. 2 shows in a perspective illustration a carrier unit equipped with a plurality of circuit carriers.

In FIG. 2, an assembly unit carrier 10 is illustrated, on which with regard to a conveying direction 12 of assembly unit carrier 10 within a system 100, 100*a*, described at a later point in time, three base components 2 are situated one behind the other in conveying direction 12 and three base components 2 are also situated in a transverse direction 14 situated perpendicularly to conveying direction 12. Assembly unit carrier 10 is thus used for accommodating or fastening and positioning a total of nine base components 2. To fasten base components 2, for example in the area of the receptacles, which are not illustrated in greater detail, of plate-shaped, rectangular assembly unit carrier 10, it may be provided that a plate-shaped blank holder 16 is used that has rectangular openings 18 for each base component 2, by way of example, and that is clamped against the top side of assembly unit carrier 10 with the aid of elements (not illustrated), to fasten base components 2 in the area of assembly unit carrier 10.

Figure 3:
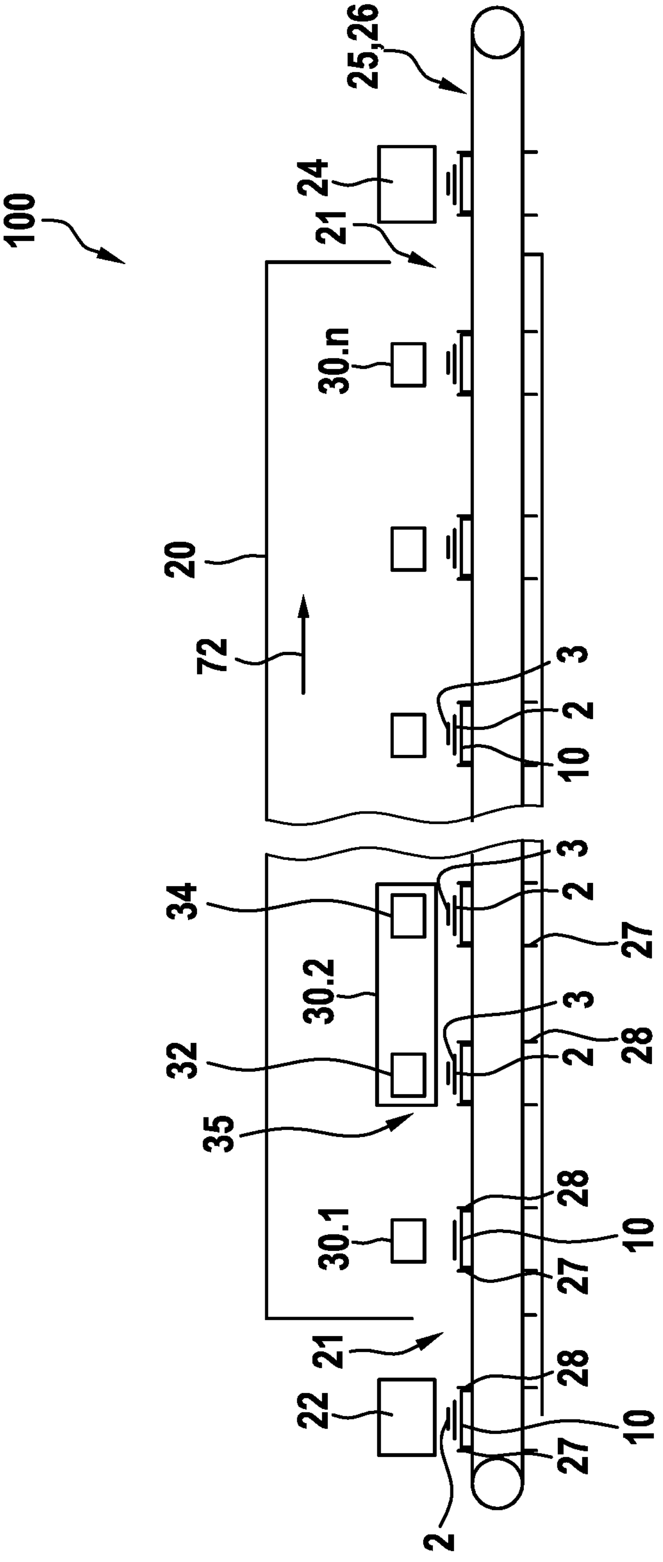
FIG. 3 shows a schematic longitudinal section of a first system for generating components in the form of an in-line system.

FIG. 3 schematically shows a heavily simplified illustration of a first system 100 for manufacturing assembly unit 1 with the aid of assembly unit carriers 10. System 100 includes a machine housing 20 designed as a closed machine housing 20 with the exception of two transport areas 21, to be able to carry out individual production or processing steps within machine housing 20 under an inert gas atmosphere (under low overpressure with regard to the surrounding atmosphere).

System 100 is designed as an in-line system having a schematically indicated placement device 22 and a removing device 24 that are situated at the input or output of machine housing 20 or close to transport areas 21, by way of example. Assembly unit carriers 10 equipped with base components 2 are situated on a component platform 25 with the aid of placement device 22. Component platform 25 is designed as an endless circumferential conveyor belt 26, by way of example, on the surface of the side of conveyor belt 26, receptacles 27, 28, which are situated at uniform distances from one another and between each of which an assembly unit carrier 10 is situated, being provided by way of example. The placing of assembly unit carriers 10 between receptacles 27, 28 with the aid of placement device 22 preferably takes place fully automatically, for example by handling robots (not illustrated) or the like.

With the aid of removing device 24, assembly units 1 produced within machine housing 20 are removed from component platform 25. Aids (not illustrated either) that preferably work fully automatically, such as assembly robots or the like, are also used for this purpose. These are designed to remove assembly unit carriers 10 equipped with assembly units 1 from receptacles 27, 28 of conveyor belt 26.

Within machine housing 20, a plurality of processing stations 30.1 through 30.*n* is situated. Processing stations 30.1 through 30.*n* are used to carry out processing and production steps for generating assembly units 1, as elucidated within the scope of the description of FIG. 1 by way of example. At least one of processing stations 30.1 through 30.*n* is designed as processing station 30.1 through 30.*n* that is used to generatively manufacture or apply a layer 3 on base component 2.

Processing station 30.2 used in the exemplary embodiment to generatively generate layer 3 includes a layering unit 32 and an irradiation unit 34, which together form a module for designing constructional unit 35. With the aid of layering unit 32, as is conventional in the related art, a layer 3 of metal powder is applied on base component 2. With the aid of irradiation unit 34, layer 3 is selectively irradiated or heated to above the melting temperature of the material, so that corresponding (solid) layer 3 is formed after the subsequent solidification. This process may be repeated any number of times to generate the required number of layers 3 on top of one another, consecutive constructional units 35 then being situated at a height offset with regard to one another, which corresponds to the layer thickness of lastly applied layer 3, in conveying direction 12 of assembly unit carriers 10. Furthermore, at least one of processing stations 30.1 through 30.*n* is designed to remove the non-solidified, powdery material of at least one layer 3 after generating layer 3 on base component 2. This processing station 30.1 through 30.*n* may also be designed as an integral part of constructional unit 35.

Figure 4:
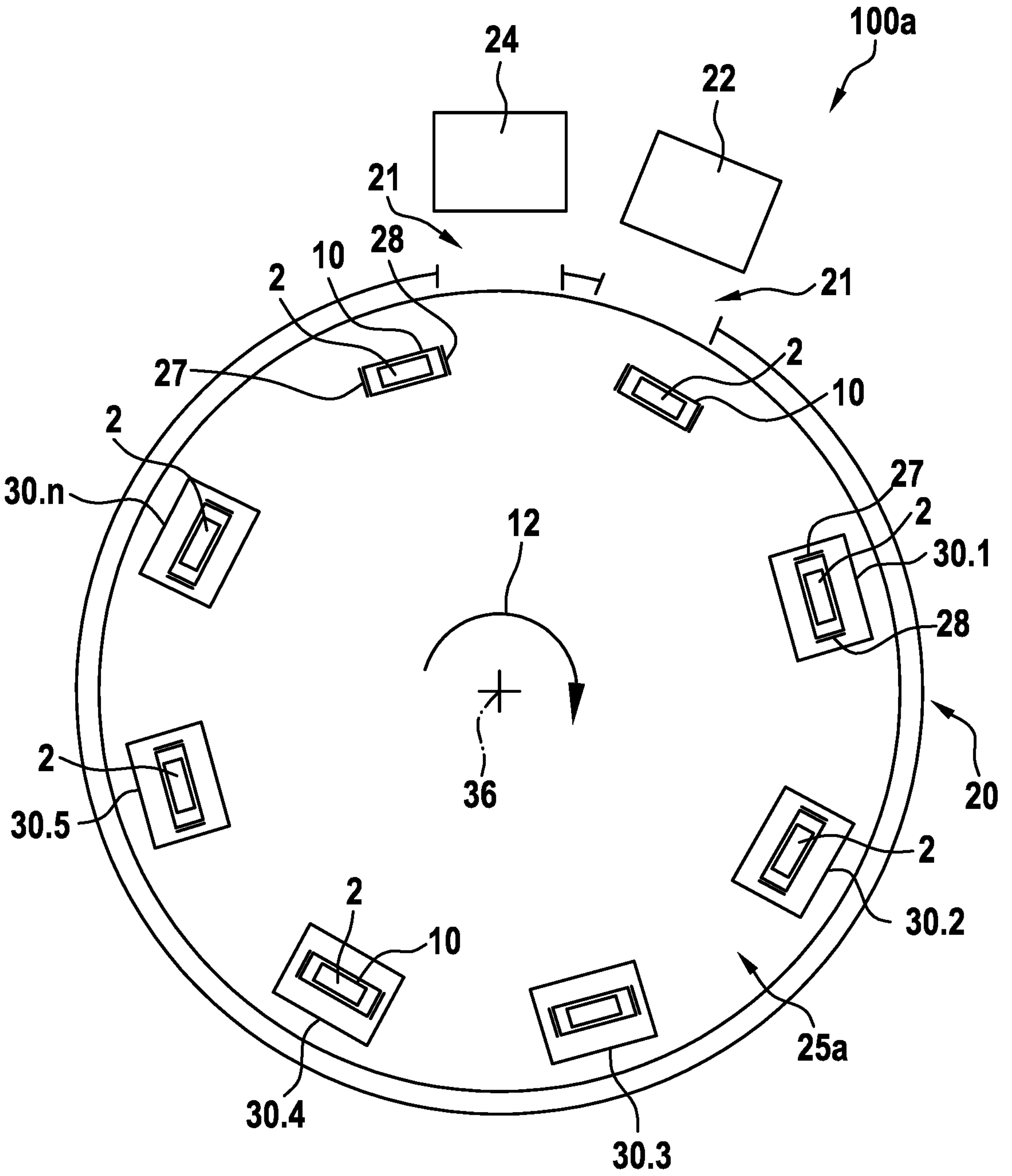
FIG. 4 shows a system in a schematic top view that is modified with regard to FIG. 3 and is designed as a carousel-type system.

FIG. 4 shows a system 100*a* which is modified with regard to FIG. 3. System 100*a* is designed as a carousel-type system including a disc-shaped component platform 25*a*, which is situated rotatably about a vertically situated axis 36 and on which assembly unit carriers 10 are situated. Component platform 25*a* is rotated clockwise in conveying direction 12.

System 100 as well as system 100*a* or corresponding component platform 25, 25*a* is preferably driven or rotated continuously.

What is claimed is:

1. A system for manufacturing assembly units, comprising:

a component platform that is movably situated in a conveying direction;

at least one layering unit configured to apply a layer; and at least one irradiation unit, situated downstream from the layering unit in the conveying direction of the component platform, configured to selectively irradiate the layer for a generative assembly of the layer; and several assembly unit carriers situated on the component platform, each of the assembly unit carriers being configured as a plate-shaped carrier to accommodate at least one base component of an assembly unit to be produced, on whose surface the generative assembly of the at least one layer of the assembly unit takes place, wherein the at least one base component is arranged in a plurality of rows along the conveying direction and in a transverse direction perpendicular to the conveying direction, and wherein the rows are defined by receptacles in the assembly unit carriers to position and secure the at least one base component, wherein the assembly unit carriers are pivotably mounted about at least one axis on the component platform, such that different surfaces of the base components, including opposite surfaces, are selectively exposable to the layering unit, the irradiation unit, or further processing stations.

2. The system as recited in claim 1, wherein the assembly unit carriers are situated on the component platform in the conveying direction one after another and/or perpendicularly to the conveying direction.

3. The system as recited in claim 1, wherein the system is an in-line system including a placement device configured to place the assembly unit carriers on the component platform and a removing device configured to take the assembly unit carriers off the component platform.

4. The system as recited in claim 1, wherein the system is a carousel-type system, wherein the component platform is rotatable about a platform rotation axis, and the system includes a placement device configured to place the assembly unit carriers on the component platform and a removing device configured to take the assembly unit carriers off the component platform.

5. The system as recited in claim 1, wherein at least the at least one layering unit and the at least one irradiation unit form a module-like constructional unit.

6. The system as recited in claim 1, wherein the system includes multiple layering units situated in the conveying direction of the assembly unit carriers at different levels with regard to one another.

7. The system as recited in claim 1, wherein the system is configured to manufacture circuit configurations or cooling devices as the assembly unit.

8. The system as recited in claim 1, further comprising a processing station situated along a conveyance path along which the component platform is movable and with which the generatively assembled layers are surface processesable.

9. The system as recited in claim 1, further comprising a processing station situated along a conveyance path along which the component platform is movable and with which the generatively assembled layers are cleanable.

10. The system as recited in claim 1, wherein in addition to the at least one layering unit and the at least one irradiation unit, at least one further processing station is situated along a conveyance path of the assembly unit carriers.

11. The system as recited in claim 10, wherein the at least one further processing station is an application device, or surface processing device, or cleaning device, or placement device.

12. A method for manufacturing assembly units using a system, each of the assembly units having at least one layer and generatively manufactured, the system comprising (a) a component platform that is movably situated in a conveying direction, (b) at least one layering unit configured to apply a layer, (c) at least one irradiation unit, situated downstream from the layering unit in the conveying direction of the component platform, configured to selectively irradiate the layer for a generative assembly of the layer, and (d) several assembly unit carriers situated on the component platform, each of the assembly unit carriers being configured as a plate-shaped carrier to accommodate at least one base component of an assembly unit to be produced, on whose surface the generative assembly of the at least one layer of the assembly unit takes place, wherein (I) the at least one base component is arranged in a plurality of rows along the conveying direction and in a transverse direction perpendicular to the conveying direction, (II) the rows are defined by receptacles in the assembly unit carriers to position and secure the at least one base component, and (III) the assembly unit carriers are pivotably mounted about at least one axis on the component platform, such that different surfaces of the base components, including opposite surfaces, are selectively exposable to the layering unit, the irradiation unit, or further processing stations, the method comprising:

generating at least one layer on a base component as an integral part of the assembly unit, the base component being situated on an assembly unit carrier of the several assembly unit carriers that is conveyed using the component platform of the system, wherein the generating includes applying the layer using the at least one layering unit and selectively irradiating the layer using the at least one irradiation unit for generatively assembling the layer.

13. The method as recited in claim 12, wherein the manufacturing of the assembly units includes at least one further processing procedure that is carried out using at least one processing station.

14. The method as recited in claim 12, wherein the assembly unit carriers are continuously moved within the system in the conveying direction.

15. The method as recited in claim 12, wherein the at least one irradiation unit is situated downstream from the layering unit in the conveying direction of the component platform.

* * * * *